Jan. 14, 1964
G. DURSTEWITZ
3,118,139
SPEED MEASURING APPARATUS
Filed Nov. 25, 1959
3 Sheets-Sheet 1
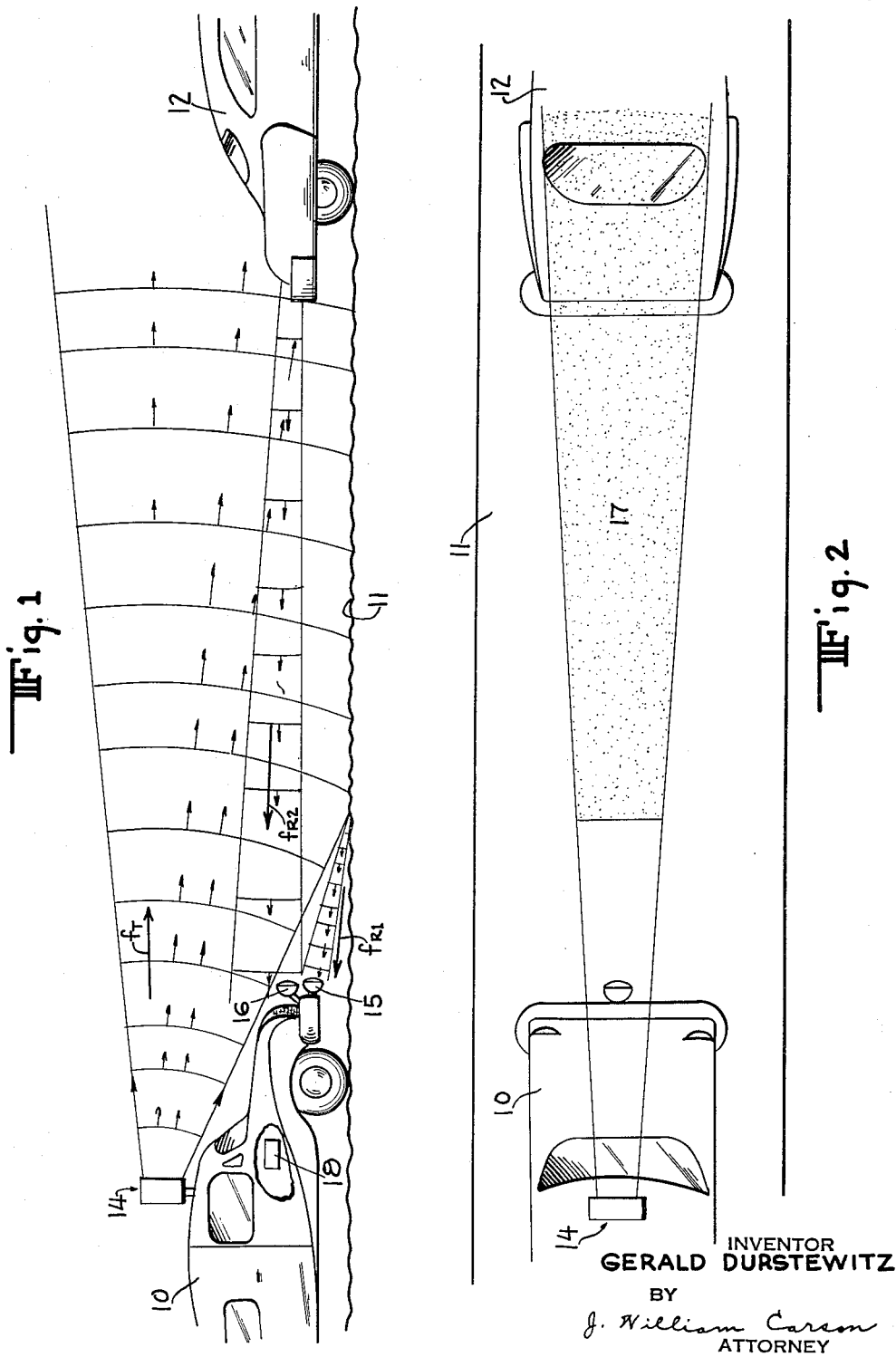
INVENTOR
GERALD DURSTEWITZ
BY
J. William Carson
ATTORNEY Jan. 14, 1964  G. DURSTEWITZ  3,118,139
SPEED MEASURING APPARATUS
Filed Nov. 25, 1959  3 Sheets-Sheet 2

INVENTOR
GERALD DURSTEWITZ
BY
J. William Carson
ATTORNEY

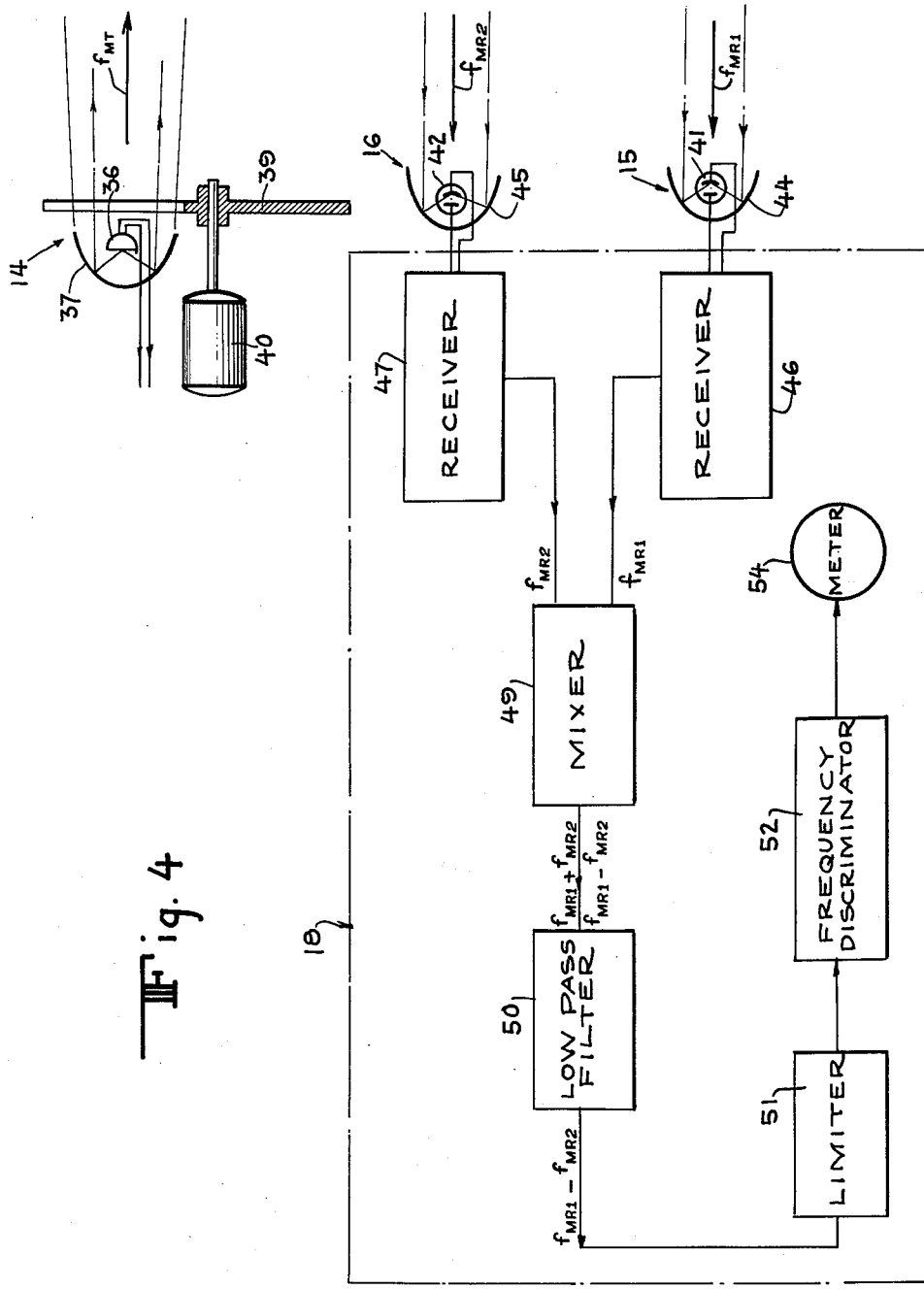

United States Patent Office 3,118,139
Patented Jan. 14, 1964

3,118,139
SPEED MEASURING APPARATUS
Gerald Durstewitz, Pompton Lakes, N.J., assignor to Specialties Development Corporation, Belleville, N.J., a corporation of New Jersey
Filed Nov. 25, 1959, Ser. No. 855,360
5 Claims. (Cl. 343—8)

This invention relates to apparatus for measuring the speed of a body relative to a surface over which it is moving, and more particularly, to such apparatus which is mounted on a second body adapted to move over the surface and operates on the Doppler principle to measure the speed of the first body with respect to the surface while the second body is moving.

In the presently known speed measuring devices and systems operating on the Doppler principle, high frequency energy is radiated toward the moving object under observation, and the radiations reflected from the object, which are modified in frequency by the relative motion of the object with respect to the measuring device, are mixed or beat with the transmitted signal to determine the frequency change of the reflected radiations with respect to the transmitted radiations.

The relative speed of the object under observation with respect to the measuring device is proportional to the degree of frequency change of the reflected radiations and therefore can easily be determined.

Since these devices measure the relative speed of the object under observation with respect to the measuring device, the absolute speed of the object, i.e. the speed of the object with respect to the surface over which it is moving, can be determined by such devices only if the measuring device is stationary.

This type of stationary speed measuring device (commonly referred to as a radar speed trap) is used in the field of law enforcement, however, the use thereof is limited because a device of this type must be placed along a highway at a point where it is not readily visible to motorists. Such locations are usually limited in number and become known to motorists enabling them to speed over the major portion of a highway and avoid detection by slowing down when passing through the area likely to be under radar surveillance.

The major role in the enforcement of the speeding laws therefore still depends on the cruising police vehicles. Although cruising police vehicles provide much greater flexibility than the radar speed trap type of device, there are several difficulties involved with their use which seriously limit their effectiveness.

In order to accurately determine the speed of another vehicle, the driver of the police vehicle must "clock" that vehicle by following it for a sufficient time, and at a sufficiently close distance, to determine that his speed is the same as that of the observed vehicle so that his speedometer is reading the speed of the observed vehicle.

Since the police vehicle must be fairly close to the vehicle being clocked, it is likely that the driver of the observed vehicle sees the police vehicle and slows down before an accurate determination of his speed can be made.

In the case where the police vehicle is parked out of sight in order to give chase to any passing vehicle which appears to be traveling at an excessive rate, this problem is particularly acute since the police vehicle must catch up to the vehicle suspected of speeding before the clocking procedure can begin.

Accordingly, an object of the present invention is to provide speed measuring apparatus which when mounted on a moving vehicle measures the absolute speed of another vehicle.

Another object is to provide apparatus mounted on a body adapted to move over a surface for measuring the speed of a second body moving over the surface, which apparatus is capable of measuring the speed of the second body with respect to the surface while the first body is in motion.

Another object is to provide such speed measuring apparatus which in response only to Doppler frequency changes gives a direct reading of the speed of an object relative to a stationary object irrespective of the speed at which the measuring device is moving.

A further object is to provide such apparatus which is simple and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification wherein:

FIG. 1 is a side view of an automobile equipped with speed measuring apparatus according to the present invention in operation and measuring the speed of a second automobile relative to the road surface which is illustrated with exaggerated irregularities.

FIG. 2 is a top view of FIG. 1 illustrating the propagation pattern of the speed measuring device.

FIG. 4 is a block diagram of a modification of the speed measuring apparatus shown in FIG. 3.

Figure 3:
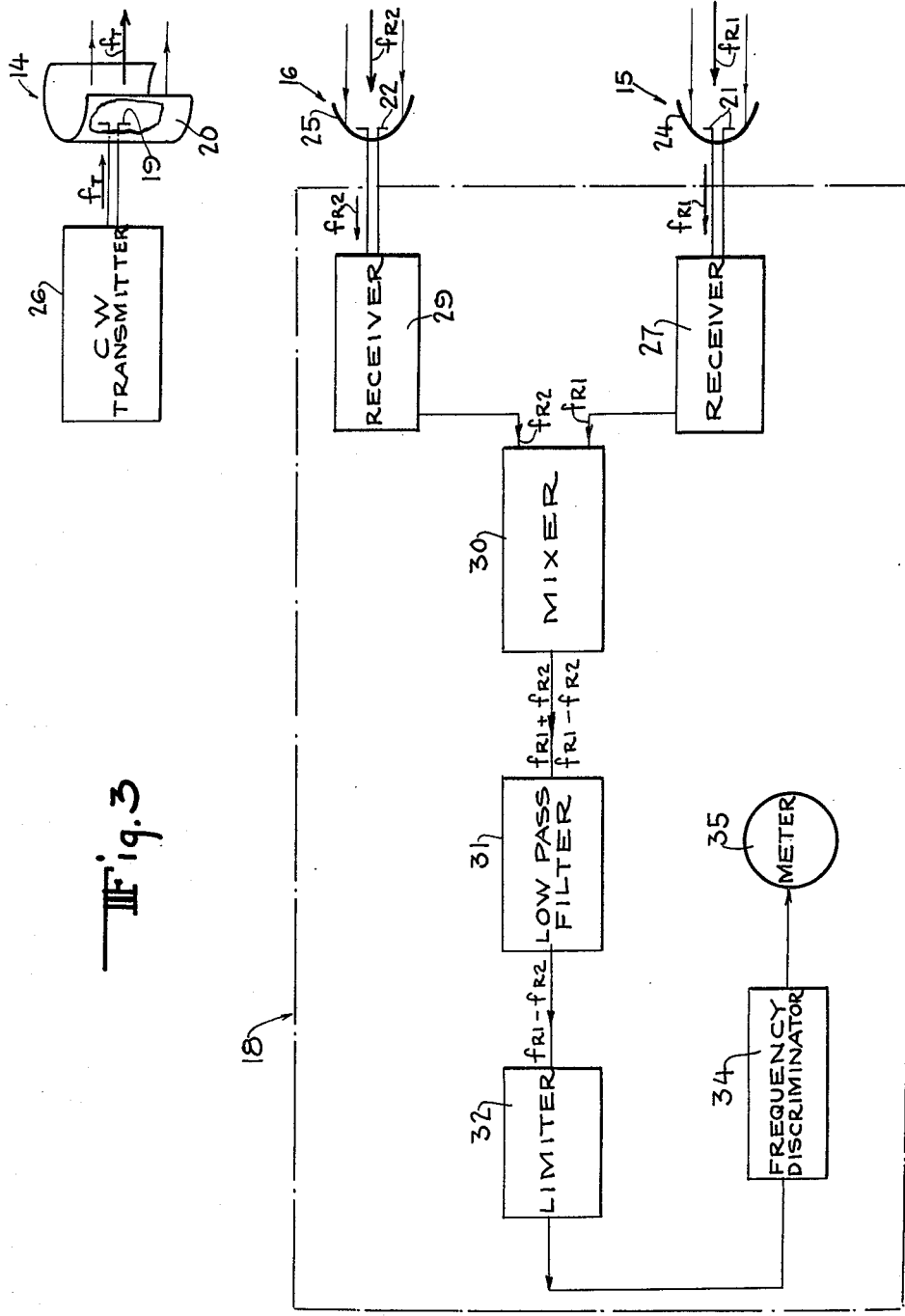
FIG. 3 is a block diagram of one form of speed measuring apparatus in accordance with the present invention.

Referring to the drawings in detail, and more particularly to FIGS. 1 and 2 thereof, there is shown a portion of an automobile 10 which is equipped with speed measuring apparatus according to the present invention and is traveling over a road surface 11 behind a partly shown second automobile 12, the absolute speed of which is being measured by the speed detecting apparatus.

The speed detecting apparatus mounted on the automobile 10 includes a transmitting transducer 14 mounted on the roof of the automobile and two highly directional receiving transducers 15 and 16 mounted at the front end of the automobile 10. The transducer 14 radiates energy at a frequency $f_T$ in a narrow beam which impinges upon the road surface 11 and the automobile 12 within the area 17 shown in FIG. 2. The road surface 11 is shown in exaggerated form with respect to the irregularities therein which reflect the radiations from the transducer 14.

The receiving transducer 15 is oriented to receive that portion of the transmitted radiations which is reflected from the road surface 11, and the receiving transducer 16 is oriented to receive that portion of the transmitted radiations which is reflected from the automobile 12.

Those radiations received by the transducer 15 have a frequency $f_{R1}$ which differs from the transmitted frequency $f_T$ by an amount proportioned to the speed of the automobile 10 relative to the surface 11. Those radiations received by the transducer 16 have a frequency $f_{R2}$ which differs from the transmitted frequency $f_T$ by an amount proportional to the speed of the automobile 10 relative to the automobile 12.

It has been discovered that the difference between the frequencies $f_{R1}$ and $f_{R2}$ is proportional to the speed of the automobile 12 relative to the surface 11.

A speed indicating device 18 mounted in the automobile 10 measures the difference between the frequencies $f_{R1}$ and $f_{R2}$ and gives a direct reading of the speed of the automobile 12 in response to this measurement.

In FIG. 3 there is shown one form of the apparatus mounted on the automobile 10 for determining the speed of the automobile 12, wherein the transducer 14 includes an antenna 19 and a vertically disposed cylindrical parabolic reflector 20, and the transducers 15 and 16 include antennas 21 and 22 respectively and parabolic reflectors 24 and 25 respectively.

The radiations transmitted by the antenna 19 are supplied by a continuous wave transmitter 26 which, for the purpose of illustration, is assumed to be operating at a frequency of 30,000 megacycles.

The receiving antennas 21 and 22 are connected to receivers 27 and 29 respectively within the speed indicating device 18 which also includes a mixer 30 connected to the outputs of the receiver, a low pass filter 31 connected to the output of the mixer, an amplitude limiter 32 connected to the output of the filter 31, a frequency descriminator 34 connected to the output of the limiter 32, and a meter 35 connected to the output of the descriminator and provided with a scale calibrated in miles per hour.

In operation, the transmitted radiations which are reflected by the road surface 11 and the automobile 12 and are received by the antennas 21 and 22 respectively, are converted into electrical signals which are amplified (and separated from any unwanted signals which might be present) in the receivers 27 and 29. The output of the receiver 27, which has a frequency $f_{R1}$ and the output of the receiver 29, which has a frequency $f_{R2}$, are combined in the mixer 30 to produce an output which has a component having a frequency equal to the sum of the input frequencies ($f_{R1}+f_{R2}$) and a component having a frequency equal to the difference between the input frequencies ($f_{R1}-f_{R2}$). The output of the mixer is passed through the low pass filter 31 to remove the high frequency component, and the low frequency component is amplitude limited by the limiter 32 and is fed into the frequency descriminator 34. The frequency descriminator 34 produces an output voltage proportional to the frequency of its input signal and the meter 35 responds to this voltage and is calibrated to give a reading in miles per hour directly proportion to the frequency of the descriminator input ($f_{R1}-f_{R2}$).

The difference in frequency between $f_{R1}$ and $f_{R2}$ is directly proportional to the speed of the automobile 12 irrespective of the speed of the automobile 10. This is demonstrated mathematically hereinafter.

It can be generally stated that radiations eminating from a transmitter and reflected by an object before being received by a receiver, when one or more of the transmitter, the reflecting object or the receiver are in motion, will have a frequency at the receiver output which differs from the frequency of the transmitter (because of the doppler effect) according to the following formula.

(1) $f_{received} = f_{transmitted} + \Delta f_{v_{XMTR}} + \Delta f_{v_{REFL}} + \Delta f_{v_{REC}}$ wherein:

$\Delta f_{v_{XMTR}}$ is the Doppler change in the frequency of the transmitted radiations due to the absolute velocity of the transmitter, $\Delta f_{v_{REFL}}$ is the Doppler change in the frequency of the transmitted radiations due to the absolute velocity of the reflector, and $\Delta f_{v_{REC}}$ is the Doppler change in the frequency of the transmitted radiations due to the absolute velocity of the receiver.

The sign of these frequency change terms is dependent upon whether the objects concerned are moving toward or away from the radiations.

In the present case, the transmitter is moving toward (following) the radiations which it emits and therefore causes a frequency increase, the reflector is moving away from the emitted radiations causing a frequency decrease, and the receiver is moving toward the reflected radiations causing a frequency increase.

By applying Formula 1 to the present case it may be seen that:

(2) $f_{R1} = f_T + \Delta f_{v\ auto\ 10} - \Delta f_{v\ surface} + \Delta f_{v\ auto\ 10}$ and (3) $f_{R2} = f_T + \Delta f_{v\ auto\ 10} - \Delta f_{v\ auto\ 12} + \Delta f_{v\ auto\ 10}$ Therefore:

(4) $f_{R1} - f_{R2} = \Delta f_{v\ auto\ 12} - \Delta f_{v\ surface\ 11}$

The velocity of the surface 11 is zero, therefore (5) $f_{R1} - f_{R2} = \Delta f_{v\ auto\ 12}$ The change in frequency caused by the Doppler effect of a moving body is equal to the initial frequency of the radiations times the ratio of the velocity of the body to the velocity of the radiations.

In the present case wherein 30,000 megacycle radio energy is utilized, the frequency change for each mile per hour of the velocity of the moving body is 44.8 cycles. Therefore:

(6) $\Delta f_{v\ auto\ 12} = 44.8\ cycles/m.p.h. \times V_{auto\ 12}\ m.p.h.$ wherein $V_{auto\ 12}$ is the velocity of automobile 12.

From Equations 5 and 6 it may be seen that (7) $f_{R1} - f_{R2} = 44.8 \times V_{auto\ 12}\ m.p.h.$ (8) $V_{auto\ 12}\ M.P.H. = \dfrac{f_{R1} - f_{R2}}{44.8}$ Since the change in frequency of the transmitted radiations due to the velocity of the automobile 10 is present in each of the Formulas 2 and 3 and always must cancel out when these formulas are subtracted, it may be seen that the speed of the automobile 12 is proportional to the difference in frequency between $f_{R1}$ and $f_{R2}$ irrespective of the speed of the automobile 10. It may further be seen that the apparatus of the present invention will also give a direct reading of the speed of the automobile 12 if the automobile 10 is backing up, or if it stopped, or if the heading of the automobile 12 were reversed and the two automobiles were proceeding toward each other.

To take advantage of the systems ability with respect to the last condition the transducers 14, 15 and 16 may be made to be rotated slightly to project the transmitted beam into the on-coming lane and receive reflections therefrom to allow the driver of the automobile 10 to monitor the speed of approaching automobiles in that lane.

In FIG. 4 there is shown a modification of the apparatus of FIG. 3 wherein intensity modulated light energy is utilized instead of radio energy. This embodiment differs from the embodiment of FIG. 3. basically in that the transducer 14 produces intensity modulated light radiations and the transducers 15 and 16 are responsive to these light radiations.

In this embodiment the transducer 14 includes a source of steady light 36, a cylindrical parabolic reflector 37, a slotted disc 39 rotatably mounted with a portion thereof extending into the beam of light, and a motor 40 for rotating the disc 39 to intensity modulate the transmitted light energy at a high frequency $f_{MT}$.

The source of steady light 36 is preferably of the type which produces light having a frequency outside of the visible spectrum. The slot arrangement in the disc 39 and the speed of the motor 40 are chosen so that the intensity modulation frequency $f_{MT}$ caused by the rotation of the disc 39 is sufficiently high (for example, 300 megacycles per second) to cause motion of a few miles per hour to produce a measurable Doppler frequency change.

The receiving transducers 15 and 16 include photocells 41 and 42 respectively and parabolic reflectors 44 and 45 respectively. The photocells are connected to receivers 46 and 47 within the speed indicator 18 which also includes a mixer 49 connected to the outputs of the receiver a low pass filter 50 connected to the output of the mixer, a limiter 51 connected to the output of the filter, a frequency discriminator 52 connected to the output of the limiter, and a meter 54 connected to the output of the discriminator and provided with a scale calibrated in miles per hour.

In operation, the transmitted light radiations which are reflected by the road surface 11 and the automobile 12 are received by the photocells 41 and 42 respectively. The frequency of intensity modulation $f_{MT}$ present in the transmitted light radiations is altered, due to the Doppler effect, by the motion of the automobiles 10 and 12 so that the intensity variations of the reflections impinging upon the photocells 41 and 42 have frequencies of $f_{MR1}$ and $f_{MR2}$ respectively. The photocells 41 and 42 respond to the intensity variations and produce electrical signals having frequencies $f_{MR1}$ and $f_{MR2}$ respectively which are fed into the receivers 46 and 47 wherein they are separated from unwanted light produced signals and amplified. The outputs of the receivers are beat together in the mixer 49 and the resulting signal is passed through the low pass filter 50 to provide a signal having a frequency of $f_{MR1}-f_{MR2}$. This difference frequency signal is limited in amplitude by the limiter 51 and then fed into the discriminator 52 which produces a voltage proportional to the frequency. This voltage is monitored by the meter 54 which in response thereto gives a direct reading of the speed of the automobile 12 in miles per hour.

Under the conditions wherein the transmitted light is intensity modulated at a frequency of 300 megacycles, the Doppler frequency change for each mile per hour of the velocity of a moving body is .448 cycle. Therefore, the velocity of the automobile 12 is related to the difference frequency $f_{MR1}-f_{MR2}$ according to the following:

(9) $\quad f_{MR1}-f_{MR2}=.448 \times V_{\text{auto } 12}$ m.p.h.

or

(10) $\quad V_{\text{auto } 12} \text{ M.P.H.}=\dfrac{f_{MR1}-f_{MR2}}{.448}$

While the apparatus of the present invention is shown and described herein as being mounted on an automobile to measure the speed of another automobile, it is contemplated that the apparatus may be mounted on any vehicle moving over (either on or above) a surface to measure the speed of a second vehicle, either of the same or of a different type, moving over that surface. The apparatus could, for example, be mounted on a boat or ship to measure the speed of other boats and ships, on a low flying helicopter or other aircraft to measure the speed of either land or water vehicles, or on an aircraft to measure the speed of other aircraft.

In addition, although the apparatus of the present invention is illustrated and described as having a single transmitting transducer and two receiving transducers, the invention is not limited to this arrangement and contemplates the use of any of several transducer arrangements which may be utilized to provide the desired difference frequency and will readily occur to one skilled in the art.

From the foregoing description it will be seen that the present invention provides simple and reliable speed measuring apparatus which when mounted on a moving vehicle measures the absolute speed of another vehicle.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Speed measuring apparatus mounted on a body moving with respect to an object for detecting the speed of a second moving body relative to the object including in combination means for radiating energy at a predetermined frequency toward the second body and toward the object and for receiving the radiations reflected from the second body and from the object, means for comparing said received radiations and producing a signal having a frequency equal to the difference between the frequency of the received radiations reflected from the object and the frequency of the received radiations, reflected from the second body, and means responsive to said difference frequency signal for giving an indication of the speed of the second body with respect to the object.

2. Speed measuring apparatus mounted on a vehicle moving over a surface for detecting the speed of a second vehicle moving over the surface including in combination means for radiating energy at a predetermined frequency toward the second vehicle and toward the surface and for receiving the radiations reflected from the second vehicle and from the surface, means for comparing said received radiations and producing a signal having a frequency equal to the difference between the frequency of the received radiations reflected from the surface and the frequency of the received radiations reflected from the second vehicle, and means responsive to said difference frequency signal for giving an indication of the speed of the second vehicle with respect to the surface.

3. Speed measuring apparatus according to claim 2 wherein said radiated eenrgy has a frequency which, in relation to the velocity of propagation of the energy, is of sufficiently rapidity that a body moving at a rate of a few miles per hour will cause a measurable Doppler change in said frequency.

4. Speed measuring apparatus mounted on a body moving with respect to an object for detecting the speed of a second moving body relative to the object including in combination means for radiating high frequency energy intensity modulated at a predetermined frequency toward the second body and toward the object and for receiving the radiations reflected from the second body and from the object, means for comparing said received radiations and producing a signal having a frequency equal to the difference between the frequency of the intensity modulation of the received radiations reflected from the object and the frequency of the intensity modulation of the received radiations reflected from the second body, and means responsive to said difference frequency signal for giving an indication of the speed of the second body with respect to the object.

5. Speed measuring apparatus mounted on a vehicle moving over a surface for detecting the speed of a second vehicle moving over the surface including in combination means for radiating light energy intensity modulated at a predetermined frequency toward the second vehicle and toward the surface and for receiving the radiations reflected from the second vehicle and from the surface, means for comparing said received radiations and producing a signal having a frequency equal to the difference between the frequency of the intensity modulation of the received radiations reflected from the surface and the frequency of the intensity modulation of the received radiations reflected from the second vehicle, and means responsive to said difference frequency signal for giving an indication of the speed of the second vehicle with respect to the surface.

References Cited in the file of this patent

UNITED STATES PATENTS 2,422,064   Anderson _____ June 10, 1947